Oct. 29, 1963  M. NASH ETAL  3,108,882
METHOD OF PREPARING AN EDIBLE FISH PRODUCT
Filed Jan. 29, 1963
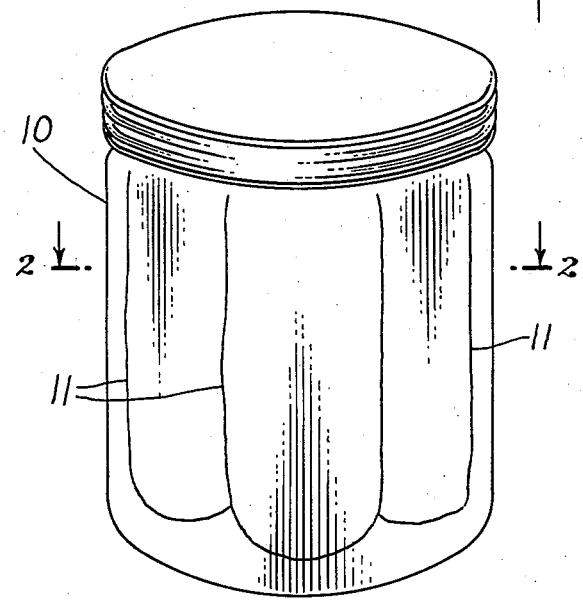
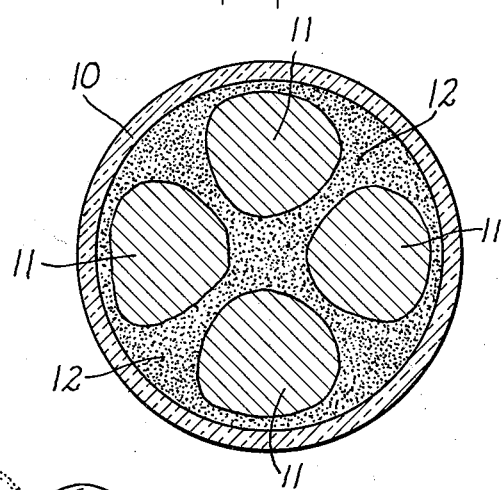
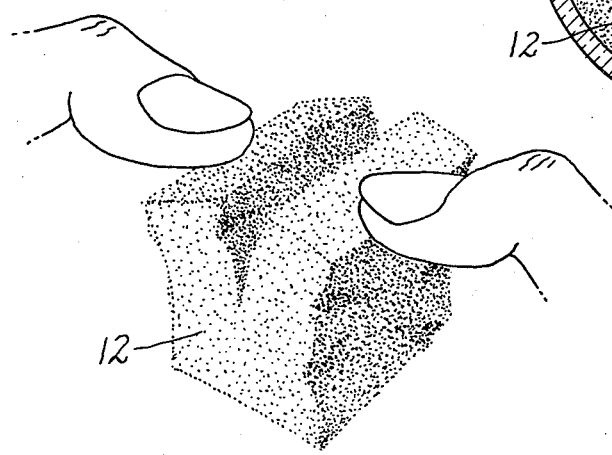
INVENTORS
Monroe Nash
Erich G. Freudenstein
BY
ATTORNEY 3,108,882
METHOD OF PREPARING AN EDIBLE FISH PRODUCT
Monroe Nash, 117 W. 197th St., New York, N.Y., and Erich G. Freudenstein, Lakewood, N.J.; said Freudenstein assignor to said Nash
Filed Jan. 29, 1963, Ser. No. 261,550
4 Claims. (Cl. 99—188)

This invention relates to a packaged food product; and more specifically to a product known as gefüllte fish or stuffed fish.

This application is a continuation in part of our application Serial No. 712,927, now abandoned, filed February 3, 1958, entitled Packaged Food and Method of Making the Same, and of application Serial No. 88,591, filed January 6, 1961, entitled Packaged Food and Method of Making the Same, and Serial No. 99,253, filed March 29, 1961, entitled Packaged Food and Method of Making the Same.

The invention deals with packaged or canned food products which are frequently bottled in jars and known as "gefüllte fish" which, literally translated, means "stuffed fish."

Originally, chopped or ground fish or combinations of a variety of fish, were prepared by stripping or skinning a fish, such as pike, to provide a skin casing. After blending the chopped fish meat with other fish and condiments, including binders, the practice was to stuff the fish in the whole skin previously stripped, for cooking, to be later sliced and served in portions. The readily frangible filling or stuffing was thereby maintained in an appetizing condition.

More recently, such chopped and cooked fish combination was prepared as a skinless delicacy in the form of patties, croquettes, cakes, slices, balls or bits, and still later commercialization on a large scale basis was undertaken so that a product might be provided which may be stored like some other perishable canned or bottled food stuffs.

The skinless patties, cakes or balls were most frequently packaged in glass jars and maintained in a thin fish broth or brine of fluid consistency. Where it was desired to serve this product with a gelled broth, it could not be instantly served but it required refrigeration for about twenty-four hours, and then when served at normal room temperatures, the broth would liquefy.

While modern sterilizing methods and hermetic seals provided adequate shelf life for these products against spoilage and contamination, the delicate nature of the ground, skinless fish meat, in the form of patties or balls, left much to be desired in retaining the wholesome and attractive appearance of the broth and the retention of the preformed condition of the stuffed fish products.

One objection was evidence of the decrepit condition of the patties or balls; another, separation of crumbs; sedimentation of such crumbs; retrogradation of starch. Shrinkage of the predetermined size of the bits or balls by reason of the above changes has led to an attempt to provide daily, short term service, and, accordingly, small and expensive batches of the stuffed fish products, not necessarily required by reason of deterioration of the food due to spoilage but because of the physical changes which affected the appearance of the product.

A more important change is the alteration due to loss of flavor and salt concentration in the broth which is believed to be explained by the osmotic relationship in such prior products between the fluid broth forming the matrix, and the fish combination forming the aggregate in a container or jar. Storage for protracted periods results in an undesirable loss of the concentration of salt from the fish meat, and a leaching out of the spices and flavor from the fish meat into the thin broth, to leave a flat or bland product, immediately recognized by its stale taste. Since the broth is not universally consumed by the purchasing public, it is readily understood that an unfavorable comparison has arisen between the use of the commercialized product after storage, as contrasted with the fresh, home cooked product.

Accordingly, it has been discovered that both the physical appearance of skinless gefüllte fish in the form of bits, patties, cakes, balls, slices and the flavor and taste thereof, as well as many other advantages, may be preserved by an alteration of the matrix in which the aggregate is maintained after the fish products have been completely processed, by employing an edible broth which has been predeterminedly processed and altered to provide a gelled consistency in its position about the gefüllte fish.

More specifically, it is contemplated by this invention to package ground fish products of the character designed as skinless gefüllte fish, in a broth which predeterminedly has been prepared to reach a gelled consistency at normal room temperatures, whereby when packages thereof are shelf stored, alteration in the flavor, taste and appearance is minimized, if not entirely eliminated.

Still more particularly, it is an object of this invention to provide a method for preparing and for packaging, canning, bottling, ground fish products, such as gefüllte fish, in the form of bits, patties, cakes, balls, slices in an edible broth which has been predeterminedly prepared to reach a gelled consistency at normal room temperatures, by the addition of a polysaccharide which is an extract of one of the red seaweeds taken from the group consisting of carrageen and agarophyte groups, namely, carrageen, carrageenin, agarophytes agar, agaroid, and preferably and specifically the red seaweed extract, furcellaria, and thereby surround or encase the gel as a matrix about the skinless fish as an aggregate, whereby the consumer is provided with a product in which the flavor and taste of the fish is preserved, without evidence of undergoing saline and condiment depletion in the fish and concentration thereof in the broth, whereby leaching out of the spices and flavor from the fish product into the broth is minimized, if not completely eliminated; whereby shrinkage of the fish form is minimized, and crumbling, cracking of the fish portions avoided, and at the same time preventing retrogradation of starch and sedimentation thereof in the broth matrix in storage, with its attendant loss of sales appeal due to heavy sedimentation in the glass jars.

Still more particularly, it is an object of this invention to provide skinless gefüllte fish in cans or jars in which bits, slices, cakes, etc. are packed in a broth constituting the matrix, the broth being a solid gel at normal room temperatures, whereby the aggregate need not be compacted in contiguous relation to other portions thereof or to the jar, and the aggregate is held encased in an edible, nutritious, solid gel in substantially its original condition during its shelf life, for instant serving without refrigeration, without evidencing shrinkage, loss of flavor, or exhibiting change of saline concentration in the fish meat and avoiding sedimentation due to retrogradation of starch.

To attain these objects and such further objects as may appear herein or be hereinafter pointed out, we make reference to the accompanying drawing, forming a part hereof, in which—

FIGURE 1 is a perspective view showing a jar of glass packed gefüllte fish in accordance with one embodiment of the invention, a portion being broken away to show details;

FIGURE 2 is a section taken on the line 2—2 of FIGURE 1;

FIGURE 3 is a perspective view of a fragment of gelled broth.

Reference will now be made to the drawing where it is contemplated by this invention to package in a jar 10, the ground fish product formed into patties 11 and surround the patties 11 with a matrix 12 of a gelled fish broth. The ground fish meat product contemplated is a skinless "stuffed" fish known as gefüllte fish, in the form of patties or croquettes, but may also be in the form of bits, slices, cakes, balls, etc. For purposes of convenience, the fish product will be hereinafter referred to as "stuffed fish," which term is used generically to cover the various forms in which the skinless ground fish meat product may be packaged.

Stuffed fish is prepared in the known way from a combination of ground fish meat in which a variety of ground fish is intermixed with eggs, onions, spices, condiments and a small amount of matzoh meal or cracker meal. While matzoh meal and cracker meal are the starches customarily employed, it will be understood that other starches or starchy products may be used to achieve the desired fluffiness in the fish component. The stuffed fish may be cooked in a brine solution in the known manner, a cooking period of about 10 to 15 minutes being found desirable, but in view of the method of packaging as herein devised, the stuffed fish need not be of unusual denseness to resist packaging problems, and fluffiness of the ground stuffed fish of the character desirably found in home cooked stuffed fish, and heretofore lacking in the commercial product, may be retained.

The stuffed fish is then separated from the brine solution in which it is cooked, to await packaging.

Separately, a broth in accordance with the present invention is prepared. This may be made in various ways, for example from the bones, fish heads and skins remaining from the fish previously prepared, together with the prescribed condiments or natural coloring materials, such as derived from the addition of onions, carrots, spices, seasoning, salt, in accordance with the recipe of the manufacturer, cooked in water in the usual manner and then strained and filtered to utilize the clear solution. To the initial broth thus prepared there is added a polysaccharide, which is an extract of a species of red seaweed known as furcellaria of the agarophyte family. The selected seaweed is separately prepared, the powdered product thereof being first dissolved in a small quantity of cold water to achieve a paste-like consistency. It is then simmered in hot water under controlled temperatures no higher than 212° F.

The broth separately first prepared is brought to a temperature of 212° F. and the seaweed solution described is then added to constitute from .75 to 1.0% by weight of the seaweed on a dry basis to the broth content. Preferably, the calculated amount of seaweed on a dry basis compared to the broth is to constitute 0.9% thereof.

The broth thus prepared is now ready to be glass packed.

The separately cooked stuffed fish, separated from the brine, is packed into jars in accordance with known procedure, in the illustration four patties being exemplified. Thereupon the broth is heated to a temperature of about 190° F. and then is added to the jars substantially to fill the jars and to cover the stuffed fish packed therein. The jars are immediately capped, sterilized for about sixty five to seventy five minutes at 240° F., and then cooled in running cold water until they reach a temperature of approximately 105° F. At this stage, the broth gels to a solid condition, encasing the stuffed fish, and the product is ready to be consumed or stored on the shelf without refrigeration so long as the original capping or seal is maintained in position.

The stuffed fish with the broth thus gelled may be served to satisfy the tastes of those who desire the gelled broth. As contrasted with stuffed fish cooked with the gelling components of the fish in situ, no refrigeration is necessary. However, for those who wish to consume the fish as prepared herein but without a gelled consistency of the broth, the jar of fish may be heated to melt and liquefy the broth, as the broth melts under heating.

If the contents of the jar is removed at normal room temperatures, the broth of gelled consistency may be separated by crumbling it away from the stuffed fish. The gelled broth in accordance with this invention is characterized by fracturing consistency, as indicated in FIGURE 3. The consistency of the gelled broth as herein prepared adds qualities to the skinless stuffed fish, assuring long shelf life and retention of all of its desirable characteristics. The transparent characteristics of the gel remain unmodified during protracted periods of storage. Crumbling, breakage or cracking of the fish portions is prevented. Shrinkage of the stuffed fish or portions thereof in the jars is avoided. Even after protracted periods of storage, there is no evidence of sedimentation due to retrogradation of the starch added as described in small proportions to the stuffed fish mixture. The saline concentration in the stuffed fish remains permanent, with no appreciable concentration interchange. There is no evidence of a change in flavor or taste usually experienced in stuffed fish packed in liquid broth or brine. Skinless stuffed fish of a more delicate and fluffy consistency may thereby be commercially packed, with assurance that it does not decrepitate and crumble in the broth, which would ordinarily detract from its appearance and saleability. The solid gelled broth in accordance with this invention adds a nutritional component to the packaged product, as contrasted with the liquid broth, which is usually discarded. Transportation of the commercially packaged stuffed fish prepared in accordance with this method does not create a problem by reason of the agitation to which the packaged food may be subjected, and the original attractive appearance of the stuffed fish is not altered.

While there has been exemplified a range of seaweed addition for temperate climates in the range of from .75 to 1% of the liquid broth, it will be understood that other gelling agents may, in a measure, suggest themselves, with alterations to meet other temperature conditions.

It should be noted that the gel encased, skinless stuffed fish as herein defined is to be distinguished from an in situ formed gel in cooking fish in that the in situ cooked broth which thickens equalizes the taste-flavor factors between the broth and the fish, and the process of cooking to the in situ gelled condition tends to cause the stuffed fish to crumble and dislodge particles at the surface during cooking, and requires subsequent refrigeration to maintain the same in the viscous condition.

Accordingly, in the claims where the term "encased" is used, it is meant to include a matrix of the gelled broth which tends to encapsulate the skinless stuffed fish products as an aggregate therein rather than an interfusion of the stuffed fish and broth, due to an in situ formation and refrigeration which has been employed in home cooking of skin encased fish which can withstand the rigorous cooking treatment to thicken the broth.

The broad concept of this invention will be understood to provide a broth, separately prepared, such as for example, by cooking fish trimmings, normal wholesome waste, fish tailings, to develop an edible, solid gelled consistency at normal room temperatures (70° F.), particularly achieved by the addition of the edible gelling agent of seaweed as described, to procure a substantially transparent, golden colored broth, followed by its addition to the separately cooked skinless stuffed fish, to encase the same in the jar or container for the benefits and advantages described. An admixture to the seaweed extract of locust bean gum and a sequestering agent may be made, if desired.

The specific example of seaweed extract exemplified has been discovered to be unique as a component of the broth encasing the stuffed fish in respect of its taste and texture and does not detract from the natural flavor of the accepted standard of an in situ formed, and refrigerated gelled broth; the gelled broth does not exhibit objectionable opaque appearance; it is neutral or vegetarian, to be acceptable under Hebrew dietary laws; the gelling property is not damaged by the high temperature of sterilization in the manner in which a comparable amount of gelatin would be affected, thereby further assuring long shelf life.

Having thus described the invention and illustrated its use, what is claimed as new and is desired to be secured by Letters Patent is:

1. The method of preparing an edible fish product which comprises the steps of cooking in a brine solution a mixture comprising ground fish meat, flavoring and a starchy product, separating the resultant product from the brine solution and depositing the same in glass jars, separately preparing a broth by admixing ingredients comprising salt, water, flavoring and an edible gel forming extract comprising one of the red seaweeds taken from the group consisting of carrageen and agarophyte groups, in quantity of about .75% to about 1.00% dry weight based on liquid broth, said broth being resistant to decomposition at sterilizing temperatures of about 240° F., adding said broth to said jars while said broth is heated to a liquid condition, capping said jars, and subjecting said jars to sterilizing temperatures.

2. The method of preparing a jarred edible stuffed fish product comprising the steps of cooking a ground stuffed fish component, including a starch, in a liquid comprising a brine solution removing the fish component from the liquid solution and placing the fish component in jars, separately preparing a broth by admixing ingredients comprising salt, water, flavoring, an edible gel forming extract consisting of one of the red seaweeds taken from the group consisting of carrageen and agarophyte in quantity of about .75% to about 1.00% dry weight of extract based on the liquid broth, adding said broth to said jars while said broth is in the liquid condition, capping said jars, and subjecting said jars to sterilizing temperatures.

3. The method of preparing a jarred edible stuffed fish product comprising the steps of cooking a ground stuffed fish component, including a starch, in a liquid comprising a brine solution, removing the fish component from the liquid solution and placing the fish component in jars, separately preparing a broth by admixing ingredients comprising condiments, flavoring and an edible gel forming extract consisting of one of the red seaweeds taken from the group consisting of carrageen and agarophyte in quantity of about .75% to about 1.00% dry weight of the extract based on the broth to water, at about 212° F., adding said broth to said jars, capping said jars and thereafter sterilizing said capped jars at a temperature of about 240° F.

4. The method of preparing an edible fish product which comprises the steps of cooking in a brine solution a mixture of ground fish meat, a starchy product and flavoring, separating the resultant product from the brine and depositing the same in a transparent jar, separately preparing a broth resistant to decomposition at sterilizing temperatures of about 240° F., said broth being prepared by admixing ingredients comprising flavoring, water and an extract of furcellaria of the agarophyte family in quantity of about .75% to about 1.00% dry weight of the extract based on liquid broth, adding said broth to said jars, capping said jars and sterilizing said jars at about 240° F. for about 65 to 75 minutes.

References Cited in the file of this patent
UNITED STATES PATENTS

| | | |
|---|---|---|
| 1,408,803 | Gamage | Mar. 7, 1922 |
| 1,855,948 | Drosin | Apr. 26, 1932 |
| 2,487,957 | Wexler | Nov. 15, 1949 |
| 2,785,075 | Malecki | Mar. 12, 1957 |

OTHER REFERENCES

"Jewish Cookery," 1952, by L. W. Leonard, published by Crown Publishers, New York, pages 166 and 167.